US010958619B1

(12) United States Patent
Jones et al.

(10) Patent No.: US 10,958,619 B1
(45) Date of Patent: Mar. 23, 2021

(54) SYSTEM AND METHOD FOR PRIVATE MEDIA CASTING ON A SHARED NETWORK

(71) Applicant: World Cinema, Inc., Houston, TX (US)

(72) Inventors: Nicholas Jones, Houston, TX (US); Daniel Cousar, Richmond, TX (US); Jonathan Hayden, Friendswood, TX (US)

(73) Assignee: World Cinema, Inc., Houston, TX (US)

( * ) Notice: Subject to any disclaimer, the term of this patent is extended or adjusted under 35 U.S.C. 154(b) by 0 days.

(21) Appl. No.: 16/572,166

(22) Filed: Sep. 16, 2019

(51) Int. Cl.
*H04L 29/12* (2006.01)
*H04L 29/06* (2006.01)
*H04L 29/08* (2006.01)

(52) U.S. Cl.
CPC .......... *H04L 61/25* (2013.01); *H04L 61/1511* (2013.01); *H04L 65/4076* (2013.01); *H04L 67/2823* (2013.01)

(58) Field of Classification Search
CPC . H04L 65/4076; H04L 67/10; H04L 65/1069; H04L 12/1895; H04L 12/56
See application file for complete search history.

(56) References Cited

U.S. PATENT DOCUMENTS

| 6,941,511 B1* | 9/2005 | Hind | G06F 40/123 |
| | | | 715/235 |
| 10,686,856 B1 | 6/2020 | Straitiff et al. | |
| 2014/0086244 A1* | 3/2014 | Keesara | H04L 12/465 |
| | | | 370/390 |
| 2014/0269703 A1* | 9/2014 | Sundaresan | H04L 61/1511 |
| | | | 370/390 |
| 2019/0182060 A1* | 6/2019 | Simotas | H04L 12/1886 |

OTHER PUBLICATIONS

Mockapetris, P. "Domain Names—Implementation and Specification." Network Working Group. Nov. 1987, pp. 1-56. Retrieved from: https://tools.ietf.org/html/rfc1035#section-4.1.4.
Cheshire, S. and M. Krochmal. "Multicast DNS." Internet Engineering Task Force (IETF). ISSSN: 2070-1721. Feb. 2013. pp. 1-71. Retrieved from: https://tools.ietf.org/html/rfc6762.
"Multicast DNS." Sep. 16, 2019, pp. 1-6. Retrieved from: https://en.wikipedia.org/wiki/Multicast_DNS.

* cited by examiner

*Primary Examiner* — Lance Leonard Barry
(74) *Attorney, Agent, or Firm* — Blank Rome LLP (57) ABSTRACT

A method includes receiving, at a proxy server, a multicast announcement through a first network. The multicast announcement is received from a casting device. The method further includes multicasting, from the proxy server, a modified version of the announcement to a second network.

20 Claims, 9 Drawing Sheets

SYSTEM AND METHOD FOR PRIVATE MEDIA CASTING ON A SHARED NETWORK

TECHNICAL FIELD

The present disclosure relates to media casting systems.

BACKGROUND

A media casting device (e.g., Chromecast®) (Chromecast is a registered trademark of Google LLC of Mountain View Calif.) is configured to access media content based on commands from a user device (e.g., a mobile phone, tablet computer, etc.) and provides the media content to a media output device (e.g., a display device, an audio output device, etc.). The casting device may be connected to the media output device and connected to a network (e.g., a WiFi® network). The casting device may announce itself to devices on the network via an Internet protocol (IP) multicast message (e.g., a multicast domain name system message) and may be controlled by any device connected to the network that receives the IP multicast message. For example, a user device connected to the network may instruct the casting device to access media content hosted by a particular provider via the Internet and to present the media content at the media output device. However, in some situations, a provider or owner of the casting device may not wish to provide access to the casting device to each device connected to a network. For example, a hotel operator may provide a guest wireless network and may provide a casting device in room 302 of a hotel, but the hotel operator may not wish to allow a guest staying in room 303 who has access to the guest wireless network to control the casting device in room 302.

To address this issue, some systems place casting devices on a separate network from user devices that control the casting devices and include a proxy server to bridge communications between the casting devices and the user devices. For example, the proxy server may receive an IP multicast message including an announcement of a casting device via a first network and may repackage the announcement in a unicast message sent to a specific user device on a second network. Unfortunately, in some implementations, software executable by the user device to interact with the casting device may not support receiving such an announcement in a unicast message. Accordingly, the user device may be unable to detect casting device announcements sent by the proxy server.

SUMMARY

Systems and methods for private media casting on a shared network are disclosed. An example system includes a casting device, a proxy server, and a user device. The casting device is connected to a first network and the user device is connected to a second network while the proxy server is connected to both the first network and the second network. The first and second wireless networks may include wireless local area networks (WLAN), virtual local area networks (VLAN), or a combination thereof. The proxy server receives a first multicast message from the casting device including an announcement by way of the first network and transmits a second multicast message including a modified version of the announcement to the second wireless network. Because the modified version of the announcement is transmitted in a second multicast message, user devices that do not support receiving announcements via unicast may receive the modified version of the announcement.

In some implementations, a method includes receiving, at a proxy server, a multicast announcement through a first network. The multicast announcement is received from a casting device. The method further includes multicasting, from the proxy server, a modified version of the announcement to a second network.

In some implementations, a proxy server includes one or more processors and a memory storing instructions executable by the one or more processors to receive a multicast announcement through a first network. The multicast announcement is received from a casting device. The instructions are further executable by the one or more processors to multicast a modified version of the announcement to a second network.

In some implementations, a computer readable storage device stores instructions executable by one or more processors to receive, at a proxy server, a multicast announcement through a first network. The multicast announcement is received from a casting device. The instructions are further executable by the one or more processors to multicast, from the proxy server, a modified version of the announcement to a second network.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing device" may refer to a device that includes, but is not limited to a single computer, host, server, laptop, and/or mobile device.

As used herein, the term "network device" may refer to any device that is capable of communicating and transmitting data to another device across any type of network.

As used herein, the term "computing system" may refer to a single electronic computing device or network device that includes, but is not limited to a single computer, virtual machine, virtual container, host, server, laptop, and/or mobile device. The term "computing system may also refer to a plurality of electronic computing devices and/or network devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Sequences of method steps presented herein are provided as examples and are not meant to be limiting. Thus, methods may be performed in an order alternative to that illustrated in the figures and described herein. To illustrate, a method described as including steps "A" and "B" may be performed with "A" either preceding or following "B," unless a specific order is indicated.

Figure 1:
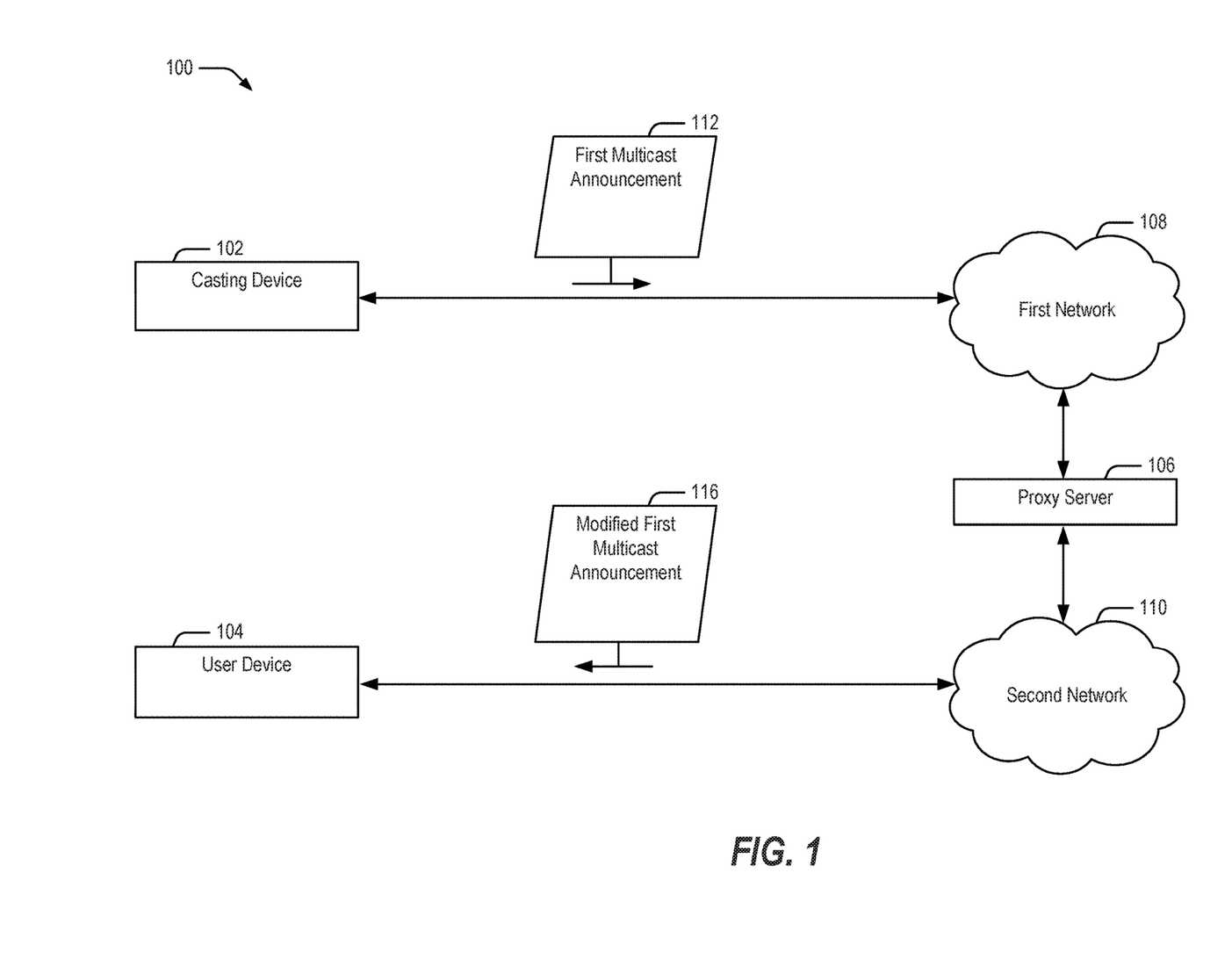
FIG. 1 is a diagram of a system for controlling a casting device on a shared network.

Referring to FIG. 1, a diagram of a system 100 for controlling a casting device on a shared network is shown. The system 100 includes a casting device 102, a proxy server 106, and a user device 104. The casting device 102 is configured to connect to the proxy server 106 through a first network 108 and the user device 104 is configured to connect to the proxy server 106 through a second network 110.

The casting device 102 corresponds to a computing device configured to access media content based on commands from a user device (e.g., the user device 104) and to provide the media content to a presentation device (not shown). While not illustrated, the casting device 102 includes one or more communication interfaces. For example, the casting device 102 may include a first communication interface (e.g., a wireless network communication interface, such as a Wi-Fi interface) configured to connect to a communications network (e.g., the first network 108) and a second communication interface (e.g., a media output interface, such as a high-definition multimedia interface) configured to output media to a presentation device. In some implementations, the casting device corresponds to a Chromecast. The casting device 102 is coupled to a first network 108. The first network 108 may include a wireless local area network (WLAN), a local area network (LAN), or other type of network. In some implementations, the casting device 102 is configured to retrieve (e.g., stream, download, etc.) the media content from a remote device via a public network (e.g., the Internet) coupled to the first network 108.

The user device 104 includes a mobile device (e.g., a laptop device, a mobile phone device, etc.) a desktop computer device, or other type of computing device. While not illustrated, the user device 104 includes a communication interface (e.g., a wireless communication interface, such as a Wi-Fi interface, or a wired communication interface, such as an Ethernet interface). The user device 104 further includes or is coupled to one or more user interface devices, such as a touch screen, keyboard, display device, speaker, etc. The user device 104 is coupled to second network 110. The second network 110 may include a WLAN, a LAN, or other type of network. In some implementations, the first network 108 and the second network 110 includes a virtual LAN (VLAN). The second network 110 may be a shared network (e.g., accessible to multiple users). The user device 104 is configured to issue commands to one or more casting devices (e.g., the casting device 102) to access media content. For example, the user device 104 may execute software configured to issue one or more commands to a casting device.

The proxy server includes a computing device, such as a server computer or other type of computing device. While not illustrated, the proxy server includes at least two communication interfaces. These communication interfaces may be virtual and/or physical. For example, the proxy server 106 may include a first virtual interface and a second virtual interface corresponding to a single physical interface. The communication interfaces of the proxy server 106 may include wired interfaces, wireless interfaces, or a combination thereof. A first interface of the at least two interfaces of the proxy server 106 is coupled to the first network 108 and a second interface of the at least two interfaces of the proxy server 106 is coupled to the second network 110. The proxy server is configured to forward messages received from the first network 108 (or a device coupled to the first network 108) to the second network 110 and visa versa as described herein. In particular, the proxy server 106 exchanges messages between the casting device 102 and the user device 104.

In particular, the proxy server 106 is configured to receive a multicast announcement (e.g., multicast domain name system (mDNS) response packet) from the first network 108 and to transmit modified a version of the announcements to the second network 110. In the illustrated example, the proxy server 106 receives a first multicast announcement 112 from the casting device 102 through the first network 108. The first multicast announcement 112 may correspond to an mDNS response packet. Data included in the first multicast announcement 112 may include a "friendly name" of the casting device 102, a length of the friendly name, a length of text included in the first multicast announcement 112, a DNS compression offset pointer, an IP address of the casting device 102, other data, or a combination thereof. In response to receiving the first multicast announcement 112, the proxy server 106 modifies the first multicast announcement 112 based on translation data stored at the proxy server 106 or remotely. Modifying the first multicast announcement 112 may include changing a friendly name listed in the first multicast announcement 112, updating a friendly name length based on the new friendly name, updating a text length based on other changes made to the first multicast announcement 112, changing a DNS compression offset pointer based on other changes made to the first multicast announcement 112, changing an IP address listed in the first multicast announcement 112, or a combination thereof. Modifying the first multicast announcement 112 results in a modified first multicast announcement 116, which the proxy server 106 sends to devices connected to the second network 110, including the user device 104. Because the modified first multicast announcement 116 is transmitted as a multicast message, the user device 104 may receive the modified first multicast announcement 116 even in embodiments in which the user device 104 executes cast device control software that is unable to receive or process unicast announcement (e.g., DNS) messages. The user device 104 may respond to the modified first multicast announcement 116 by sending one or more commands to the casting device 102 to the proxy server 106 through the second network 110.

Figure 2:
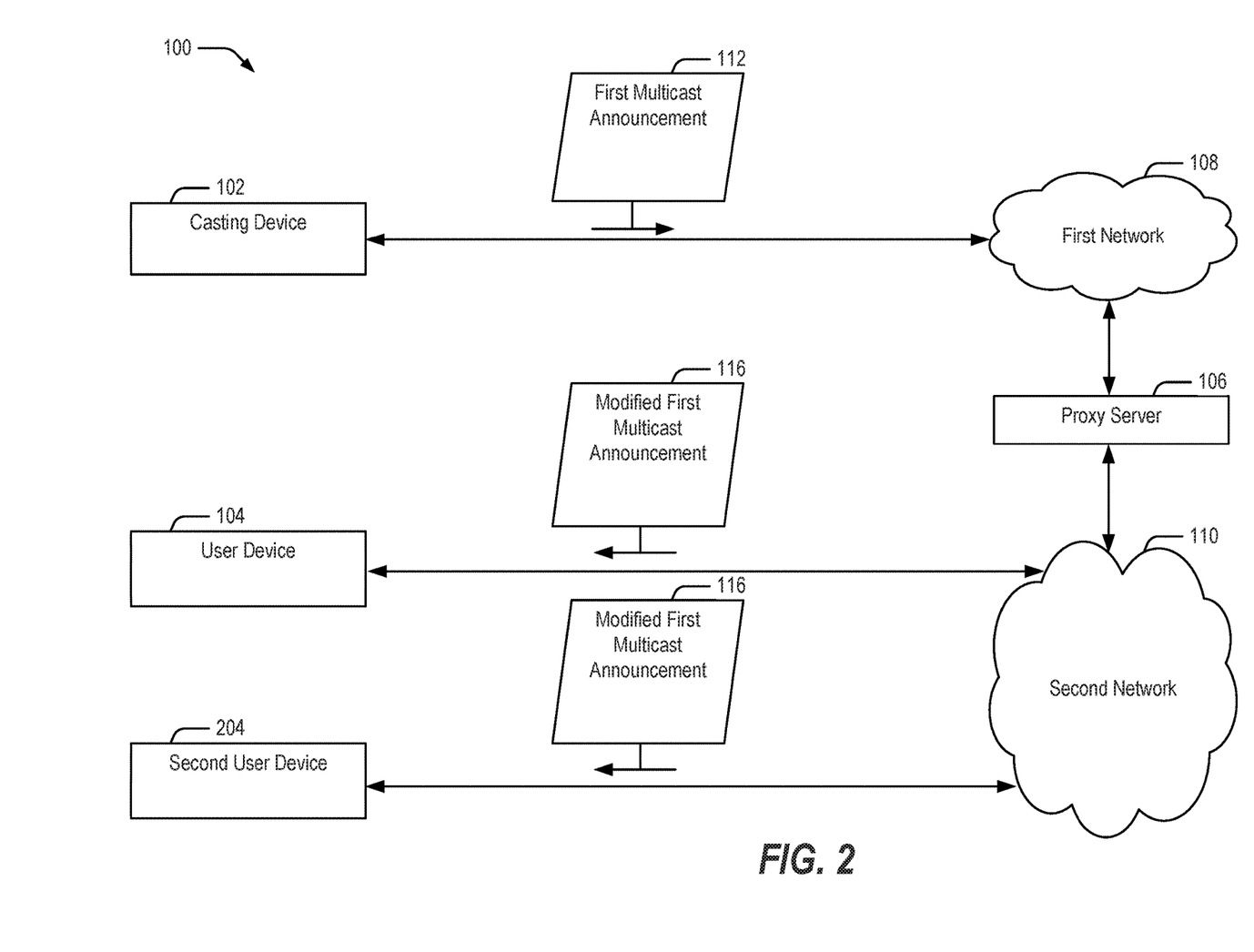
FIG. 2 is a diagram of an example of the system in which more than one user device receives announcements multicast by a proxy server.

Because the modified first multicast announcement 116 is transmitted as a multicast message, other user devices connected to the second network 110 may receive the modified first multicast announcement 116. To illustrate, FIG. 2 shows an example of the system 100 in which a second user device 204 is connected to the second network 110. In the example shown in FIG. 2, the second user device 204 receives the modified first multicast announcement 116. The proxy server 106 may be configured to unicast commands received from the user devices 104, 204 to associated casting devices based on the translation data stored at the proxy server 106 or remotely. Accordingly, a user device may be prevented from sending a command to an unrelated casting device. Thus, the system 100 maintains isolation of user devices from unrelated casting devices. For example, a user device associated with a user in a first room of a hotel may be prevented from accessing a casting device in a second room of the hotel.

Figure 3:
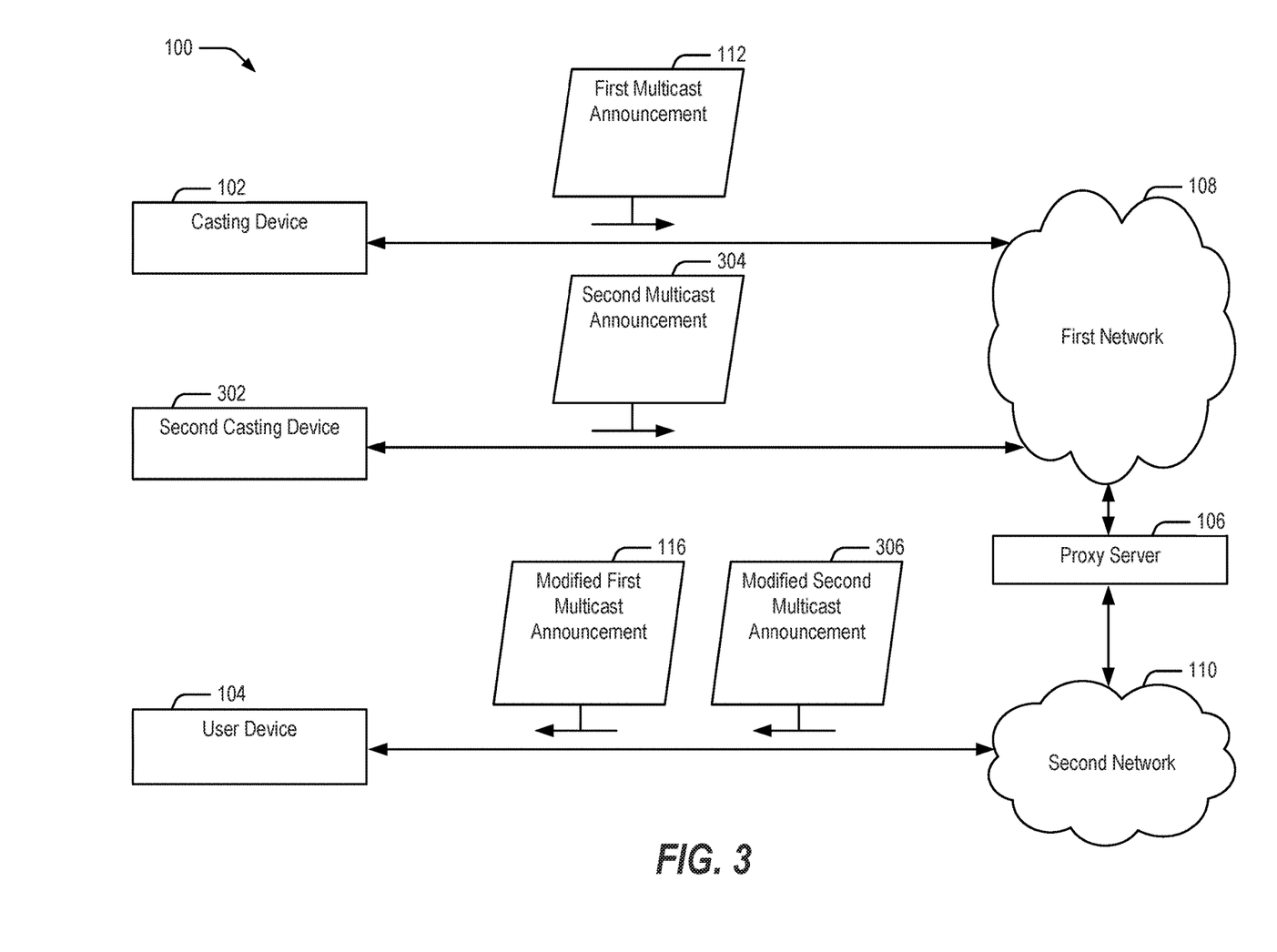
FIG. 3 is a diagram of an example of the system in which the proxy server sends modified versions of more than one multicast announcement to a user device.

Further, the proxy server 106 multicasts announcements, the user device 104 may receive multicast announcements associated with more than one casting device. To illustrate, FIG. 3 shows an example of the system 100 in which a second casting device 302 is connected to the first network 108. In the illustrated example, the second casting device 302 transmits a second multicast announcement 304 to the proxy server 106. Based on the second multicast announcement 304 and the translation data stored at the proxy server 106 or remotely, the proxy server 106 generates a modified second multicast announcement 306. The second casting device 302 may be not be associated with the user device 104 in the translation data so the user device 104 may not be able to transmit commands to the second casting device 302, yet because the proxy server 106 transmits the modified second multicast announcement 306 as a multicast message, the user device 104 may receive the modified second multicast announcement 306. The proxy server 106 may make common alterations to the announcements 112, 304 to generate the modified multicast announcements 116, 306. For example, the proxy server 106 may replace a friendly name of the casting device 102 in the first multicast announcement 112 and a friendly name of the second casting device 302 in the second multicast announcement 304 with a common friendly name. Further, the proxy server 106 may replace an IP address of the casting device 102 included in the first multicast announcement 112 and an IP address of the second casting device 302 in the second multicast announcement 304 with a common IP address (e.g., an IP address of the proxy server 106). Accordingly, the user device 104 may interpret the modified multicast announcements 116, 306 as advertising a single casting device. Therefore, a user interface generated at the user device 104 for selection of a casting device may be less cluttered by casting device information for casting devices inaccessible to the user device 104.

Thus, the system 100 may provide a more reliable proxy server in environments in which a user device does not support receiving unicast announcements (e.g., DNS data) from a casting device. Further, the system 100 may avoid a user device issuing commands to an unassociated casting device while multicasting announcements to user devices. In addition, the system 100 may reduce display at a user device of information associated with casting devices inaccessible to the user device while multicasting announcements.

Figure 4:
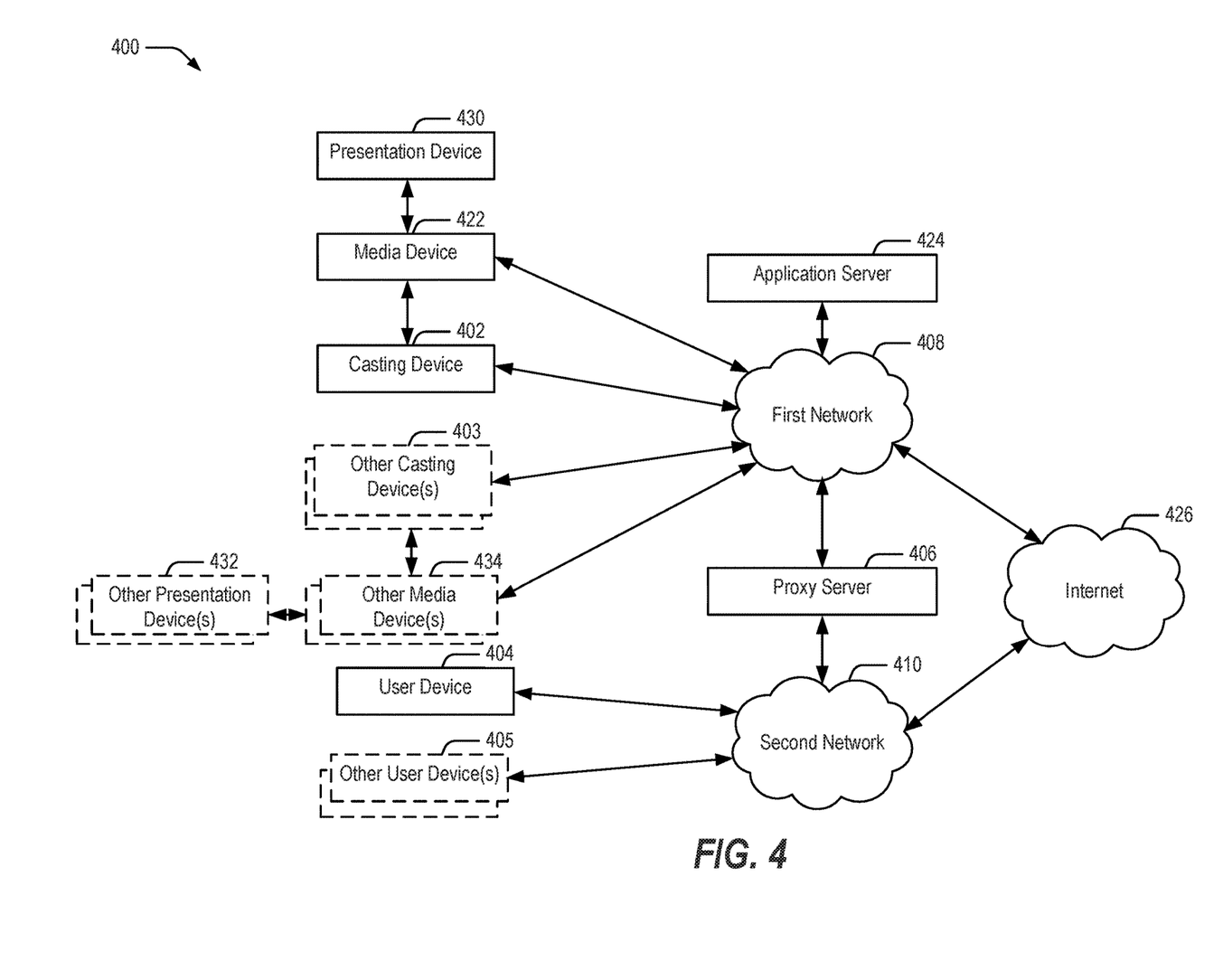
FIG. 4 is a diagram of another system for controlling a casting device on a shared network.

Referring to FIG. 4, another system 400 for controlling a casting device on a shared network is shown. The system 400 includes a presentation device 430. The presentation device 430 may include an audio output device (e.g., a speaker), an image output device (e.g., a display device), or a combination thereof. The presentation device 430 is coupled to a media device 422. The media device 422 includes a computing device configured to receive media content and to output the media content to the presentation device 430 for presentation. For example, the presentation device 430 may include a television and the media device 422 may include a "set top box" device.

The system 400 further includes a casting device 402, such as the casting device 102 of FIGS. 1-3. The casting device 402 is coupled to the media device 422 and may transmit media content to the media device 422 for presentation via the presentation device 430. The system 400 may include one or more other casting devices 403. The other casting device(s) 403 may be coupled to one or more other media devices 434 which may be coupled to one or more other presentation devices 432. It should be noted that in some alternative implementations, casting devices may be directly coupled to presentation devices rather than through a media device. The system 400 further includes a user device 404, such as the user device 104. The system 400 may further include one or more other user devices 405.

The system 400 further includes an application server 424. The application server 424 includes a server computing device. The application server 424 is configured to provide content to the media device 422 for presentation via the presentation device 430. The application server 424 is further is configured to provide content to the other media device(s) 434 if present.

The casting device 402, the other casting devices 403, the media device 422, the other media devices 434, the application server 424, and the proxy server 406 are connected to a first network 408. The first network 408 may include a WAN, a LAN, a VLAN, or a combination thereof. The first network 408 may correspond to the first network 108. In some implementations, the media device 422, the other media devices 434, the application server 424, or a combination thereof are connected to a separate third network. The first network 408 is connected to the Internet 426. Accordingly, the application server 424, the media device 422, the casting device 402, the other casting devices 403, the proxy server 406, or a combination thereof may access services hosted on the Internet 426.

The user device 404, the other user devices 405, are connected to a second network 410. The second network 410 may include a WAN, a LAN, a VLAN, or a combination thereof. The second network 410 may correspond to the second network 110. The second network 410 may correspond to a shared network to which many users, who may or may not know each other, have access. The second network 410 is connected to the Internet 426. Accordingly, the user device 404, the other user devices 405, the proxy server 406, or a combination thereof may access services hosted on the Internet 426.

As described herein, the proxy server 406 is configured to bridge communication between casting devices connected to the first network 408 and user devices connected to the second network 410. In particular, the proxy server 406 may multicast modified versions of announcement messages (e.g., mDNS discovery responses) received from casting devices on the first network 408 to user devices on the second network 410. Accordingly, user devices that are configured to receive such announcements via multicast but not unicast may receive the announcements. Further, the proxy server 406 may unicast commands received from the user devices based on translation data stored at the proxy server 406 or remotely. Modifications made by the proxy server 406 to an announcement message may include changing a friendly name listed in the announcement message. The proxy server 406 may insert the same friendly name into announcement messages received from more than one casting device. Accordingly, modified announcement messages sent by the proxy server 406 responsive to announcement messages may appear to originate from a single casting device. Further, the proxy server 406 may be configured to send commands from a user device (e.g., the user device 404) only to casting devices associated with the user device by translation data stored in the proxy server 406 or remotely. The translation data may be generated as a result of a registration process.

In some implementations, the system 400 is deployed in a hospitality context. For example, the media device 422 and the casting device 402 may be located in a hotel room. It may not be desirable for users in other hotel rooms to be able to access the casting device 402. By placing casting devices and user devices on separate networks and bridging the networks with the proxy server 406, users may be prevented by the proxy server from improperly accessing casting devices in other rooms.

Figure 5:
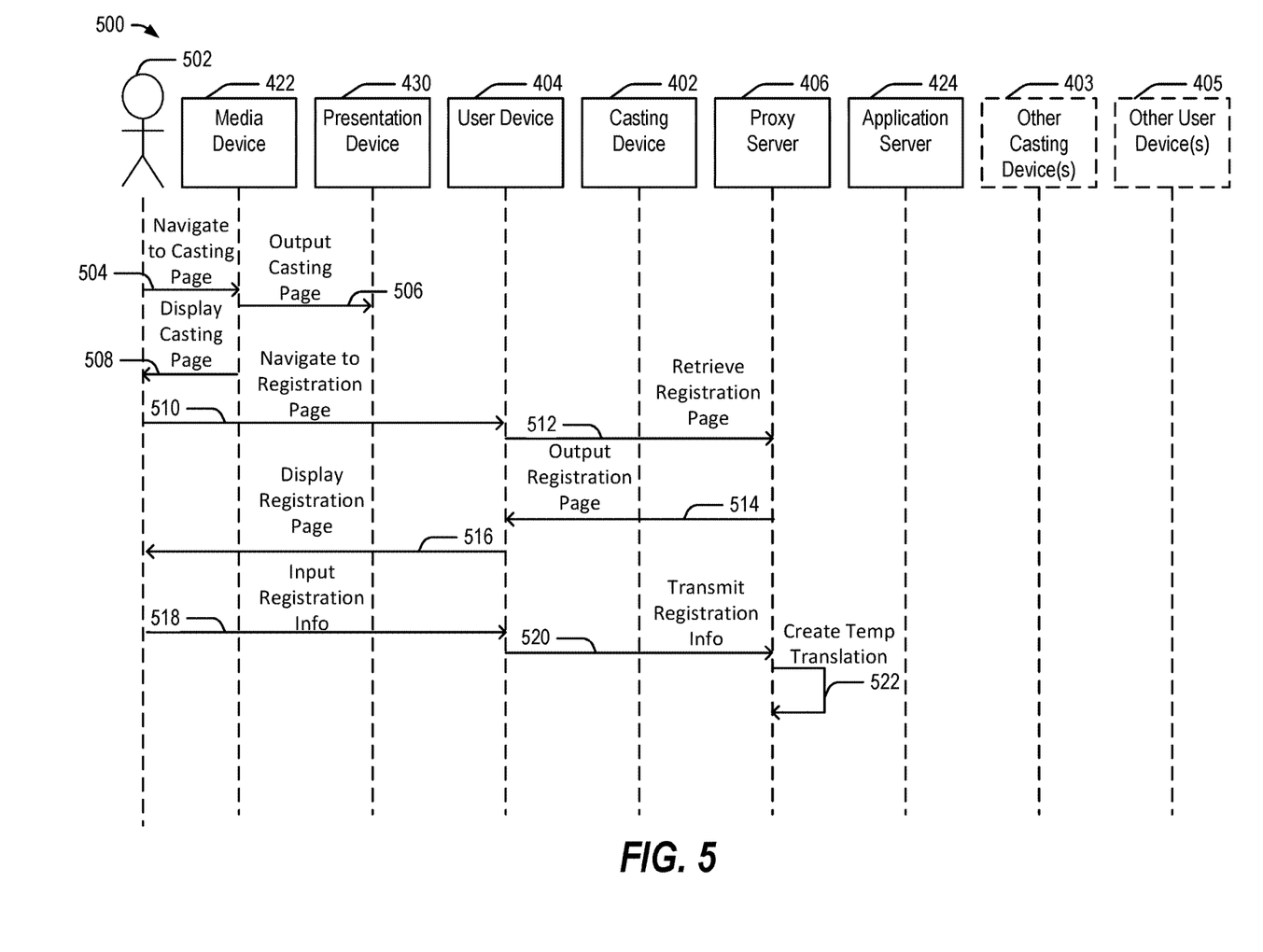
FIG. 5 is a diagram illustrating operations that may be performed by the system to register a user device at a proxy server.

FIGS. 5-9 depict example operations that may be performed by the system 400. Referring to FIG. 5, a diagram 500 illustrating operations that may be performed by the system 400 to register the user device 404 at the proxy server 406 is shown. As illustrated, a user 502 of the media device 422 may input a command to navigate to a casting page at the media device 422, at 504. For example, the user 502 may input commands to the media device 422 through a remote control device or through a control panel of the media device 422. The input may correspond to a request to change output of the media device 422 to the presentation device 430 (e.g., a channel change request). In response to the command to navigate to the casting page, the media device 422 outputs the casting page to the presentation device 430, at 506. In some implementations, the media device 422 retrieves the casting page from the proxy server 406 or the application server 424.

In response to receiving the output of the casting page, the presentation device 430 displays the casting page, at 508. The casting page includes instructions on how to register a user device (e.g., the user device 404) of the user 502 with the proxy server 406 in order to access a casting device. For example, the instructions may direct the user 502 to access a registration page accessible via the Internet 426.

The user 502 navigates an application (e.g., a web browser) of the user device 404 to the registration page, at 512, and the user device 404 retrieves the registration page, at 512. The registration page is hosted by the proxy server 406 and may be accessed by the user device 404 through the Internet 426 (by way of the second network 410) or directly through the second network 410. The user device 404 displays the registration page, at 516. The registration page includes a prompt to input registration information and an element configured to receive the registration information. In some implementations, the registration information corresponds to a hotel room in which the user 502 is staying. In other implementations, the registration information may correspond to other information.

The user 502 inputs the registration information, at 518, and the user device 404 transmits the registration information to the proxy server 406, at 520. For example, the user 502 may input a room number and initiate transmission of the room number to the proxy server 406. The registration information is transmitted to the proxy server 406 over the second network 410, the Internet 426, or a combination thereof in a packet or frame (e.g., an IP packet) that includes an identifier (e.g., an IP address) of the user device 404 (or a network address translation device associated with the user device 404). Based on the registration information and the identifier of the user device 404, the proxy server 406 creates a temporary translation, at 522. Creating the temporary translation may correspond to editing an entry in a table (or other data structure) maintained by the proxy server 406 that identifies translations between casting devices and user devices. The data structure may include an entry for each casting device connected to the first network 408 and registered with the proxy server 406. In a particular example, each entry identifies a room number, a user device IP address, a casting device IP address, a port number, and a friendly name. An illustrative format of each entry is [Room #, GuestIP, CastIP, Port, Friendly name], where the Room # field identifies a room number, the GuestIP field identifies an IP address of a user device, the CastIP field identifies an IP address of a casting device, the Port field identifies a port used by the proxy server 406 to listen for traffic from a user device.

The proxy server 406 may populate the data structure during a casting device registration process that is not depicted. Such a registration process may include the proxy server 406 transmitting a query (e.g., a mDNS discovery query) via the first network 408 to each casting device connected to the first network 408. In response to the query, each casting device connected to the first network 408 may transmit an announcement (e.g., a mDNS response) indicating a friendly name and IP address of the casting device. The friendly name may be set (e.g., by an administrator) to identify a room in which the casting device is located. For example, a casting device in room 100 may have a friendly name "cast1-100". Based on the announcements received, the proxy server 406 may populate the data structure with room numbers (e.g., derived from the received friendly names) and IP addresses of the casting devices. The proxy server 406 may assign new friendly names to each casting device. In some examples, the same friendly name is assigned to more than one casting device. For example, the casting device in room 100 and a casting device in room 200 may both be assigned the friendly name "cast." The proxy server 406 may assign different casting devices located in the same room different friendly names. For example, the proxy server 406 may assign a first casting device located in the room 200 the friendly name "cast" and a second casting device located in the room 200 the friendly name "cast2." Similarly, the proxy server 406 may assign different casting devices located in the same room different ports.

Creating a temporary translation may include inserting the IP address of the user device 404 into the user address field of each entry of the data structure associated with the room number identified by the registration information. For example, in response to the registration information identifying room 200, the proxy server 406 may insert an IP address of the user device 404 (e.g., 10.10.10.123) into entries of the translation data structure associated with the room 200. To illustrate, the translation data structure may include entries "200, 10.10.10.123, 192.168.99.111, 8009, cast" and "200, 10.10.10.123, 192.158.99.112, 50006, cast2" after the proxy server 406 creates temporary translations for the user device 404. The proxy server 406 may further store an indication that a stored translation is temporary in response to receiving the registration information. The proxy server 406 may not use temporary translations to forward packets. The proxy server 406 may change translations from temporary to active based on a confirmation process described further below. It should be noted that in some examples, the proxy server 406 does not create temporary translations. Instead, the proxy server 406 may update the translation data structure only in response to receiving confirmation of a translation.

Figure 6:
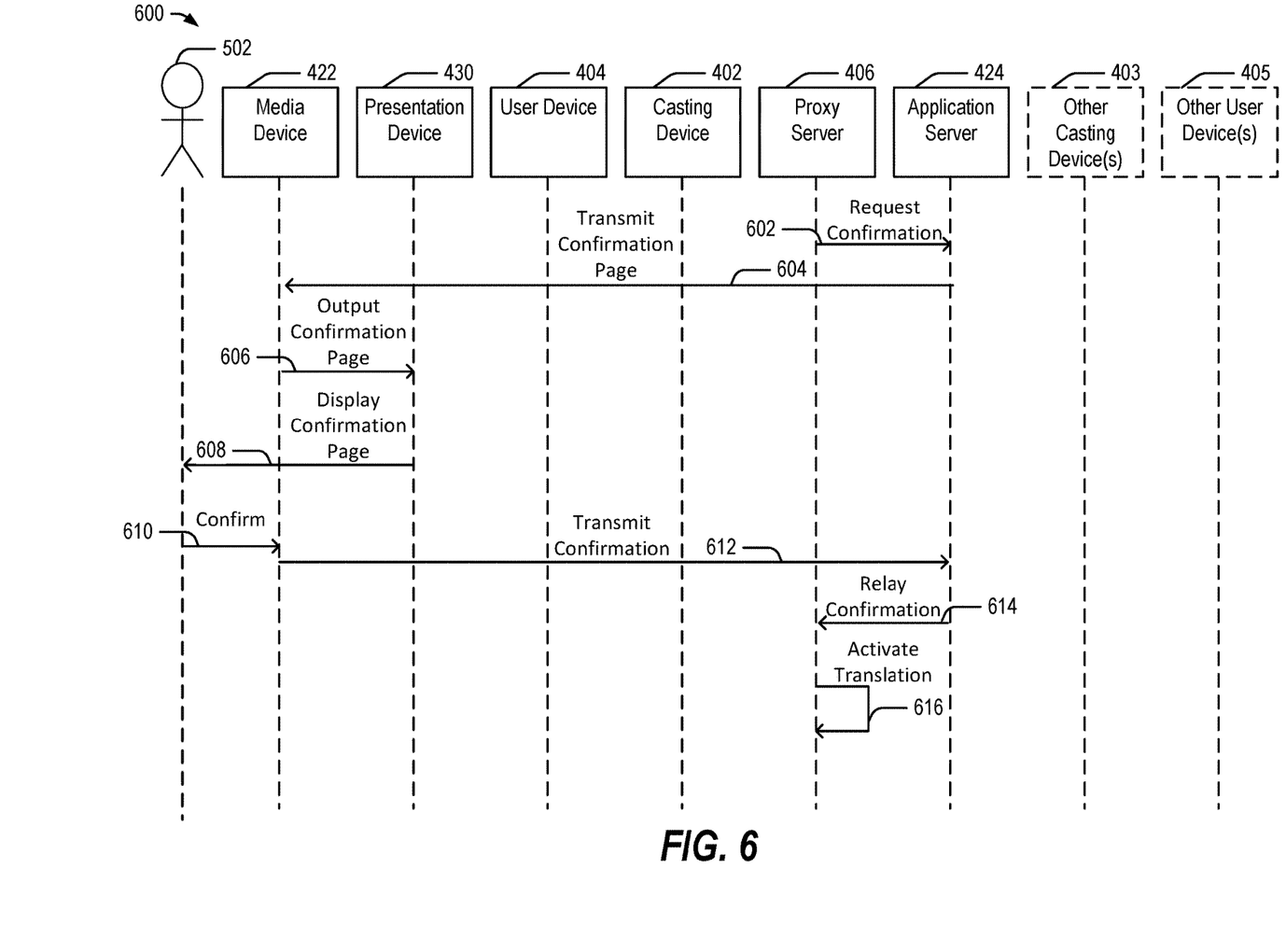
FIG. 6 is a diagram illustrating operations that may be performed by the system to confirm a translation.

Referring to FIG. 6, a diagram 600 illustrating operations that may be performed by the system 400 to confirm a translation is shown. In response to creating a temporary translation, at 522, as shown in FIG. 5, the proxy server 406 sends a request for confirmation of the registration information to the application server 424, at 602. The request for confirmation indicates the registration information (e.g., room number) of the user device 404. In response to the request for confirmation, the application server 424 transmits a confirmation page to the media device 422, at 604. The application server 424 identifies the media device 422 based on the registration information (e.g., room number) included in the request for confirmation. The application server 424 may send the confirmation page to more than one media device in examples in which more than one media device corresponds to the registration information.

In response to receiving the confirmation page, the media device 422 outputs the confirmation page to the presentation device 430, at 606, and the presentation device 430 displays the confirmation page, at 608. The confirmation page includes a prompt to confirm registration of the user device 404 to one or more casting devices (e.g., the casting device 402) associated with the registration information (e.g., the room number). Because the confirmation page is sent to a media device selected based on the registration information, a user in a different location (e.g., a different room) may not be able to confirm registration. Thus, a user in one room may be prevented from associating his/her user device with a casting device in a different room.

The user 502 sends a confirmation to the media device 422 in response to the prompt, at 610. For example, the user 502 may press a continue button a remote control button or select a continue option graphical user interface element on the confirmation page using the remote control.

In response to receiving the confirmation input from the user 502, the media device 422 transmits a message indicating confirmation of the registration information to the application server 424, at 612, and the application server 424 relays the confirmation to the proxy server 406, at 614. In response to receiving the confirmation, the proxy server 406 changes the temporary translation to an active translation and begins to relay messages based on the active translation. In examples in which temporary translations are not stored in the data structure, the proxy server 406 may store a translation in response to receiving the confirmation, at 614.

Figure 7:
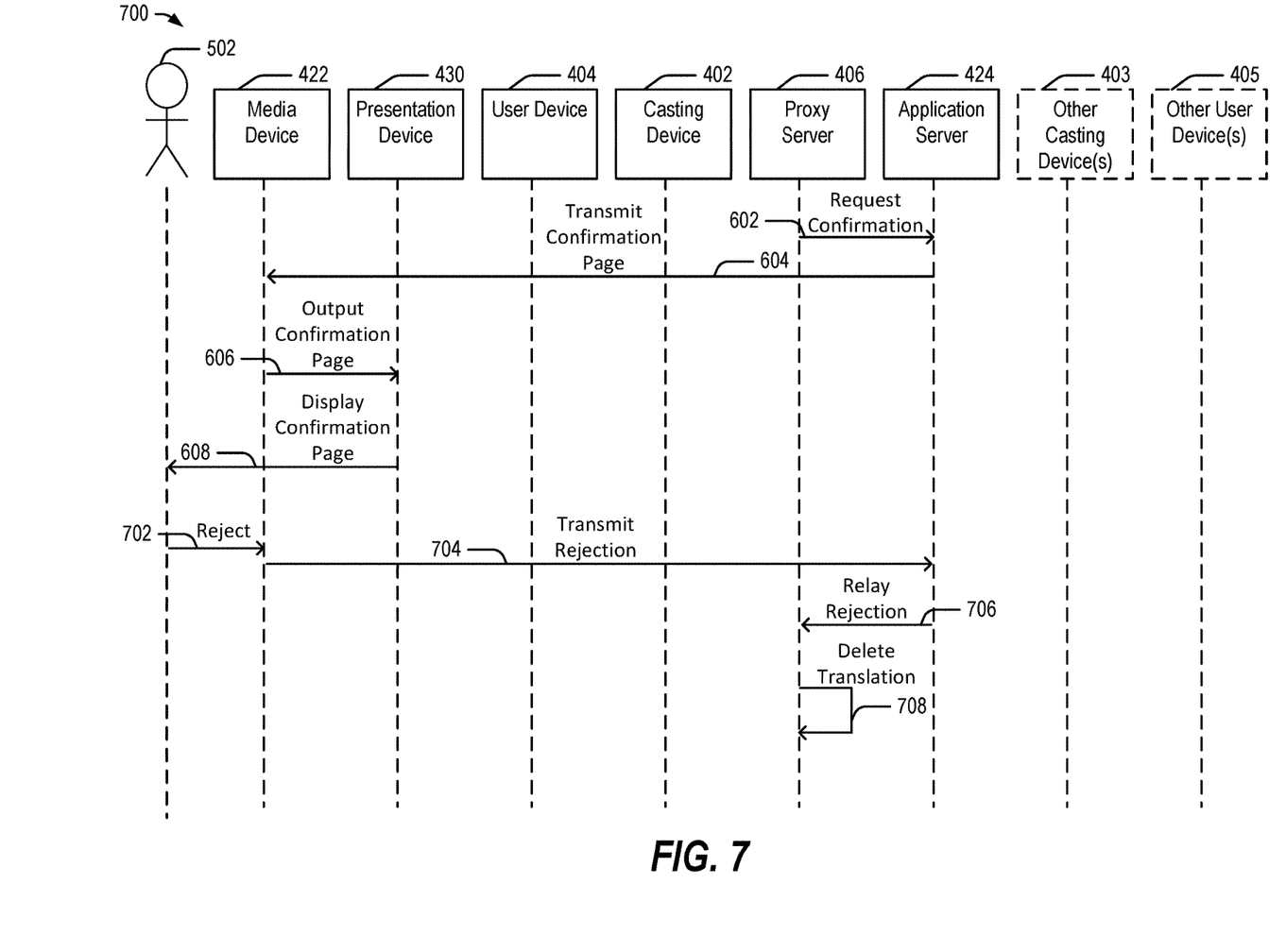
FIG. 7 is a diagram illustrating operations that may be performed by the system to reject a translation.

Thus, FIG. 6 depicts operations that may be used by a system to confirm a translation between a user device and one or more casting devices. In some use cases, a temporary translation may not be confirmed. FIG. 7 illustrates a diagram 700 of operations that may be performed by the system 400 to reject a translation. As illustrated in FIG. 7, in response to the confirmation page, the user 502 may reject registration of the user device 404 to one or more casting devices. For example, the user 502 may select a rejection option of a graphical user interface included on the confirmation page. Alternatively, the user 502 may input no response to the confirmation page within a timeout period. The presentation device 430 may interpret receiving no response within the timeout period as a rejection. In response to receiving the rejection of the registration, the media device 422 transmits a rejection message to the application server 424, at 704, and the application server 424 relays the rejection message to the proxy server 406, at 706. In response to the rejection message, the proxy server 406 deletes the temporary translation.

It should be noted that, while depicted as the same user 502 in FIGS. 5 and 7, different users may, navigate to the casting page, at 504, input the registration information, at 518, confirm the registration, at 610, reject the registration, at 702, or a combination thereof. Similarly, different media devices may output the casting page, at 506, and output the confirmation page at 606. For example, a first user in a first room may navigate to the casting page at a media device of the first room. The first user may accidentally enter in a room number of a second room as the registration information, at 518. The proxy server 406 may request confirmation of the registration of the first user's device to casting devices located in the second room, at 602, and the application server 424 may transmit the confirmation page to a media device in the second room, at 604, based on the registration information. A second user in the second room may then reject the registration attempt by the first user (or the registration attempt may time out), at 702. Thus, FIG. 7 illustrates how the system may prevent a user in one location (e.g., one room) from registering a user device to a casting device located in another location.

Figure 8:
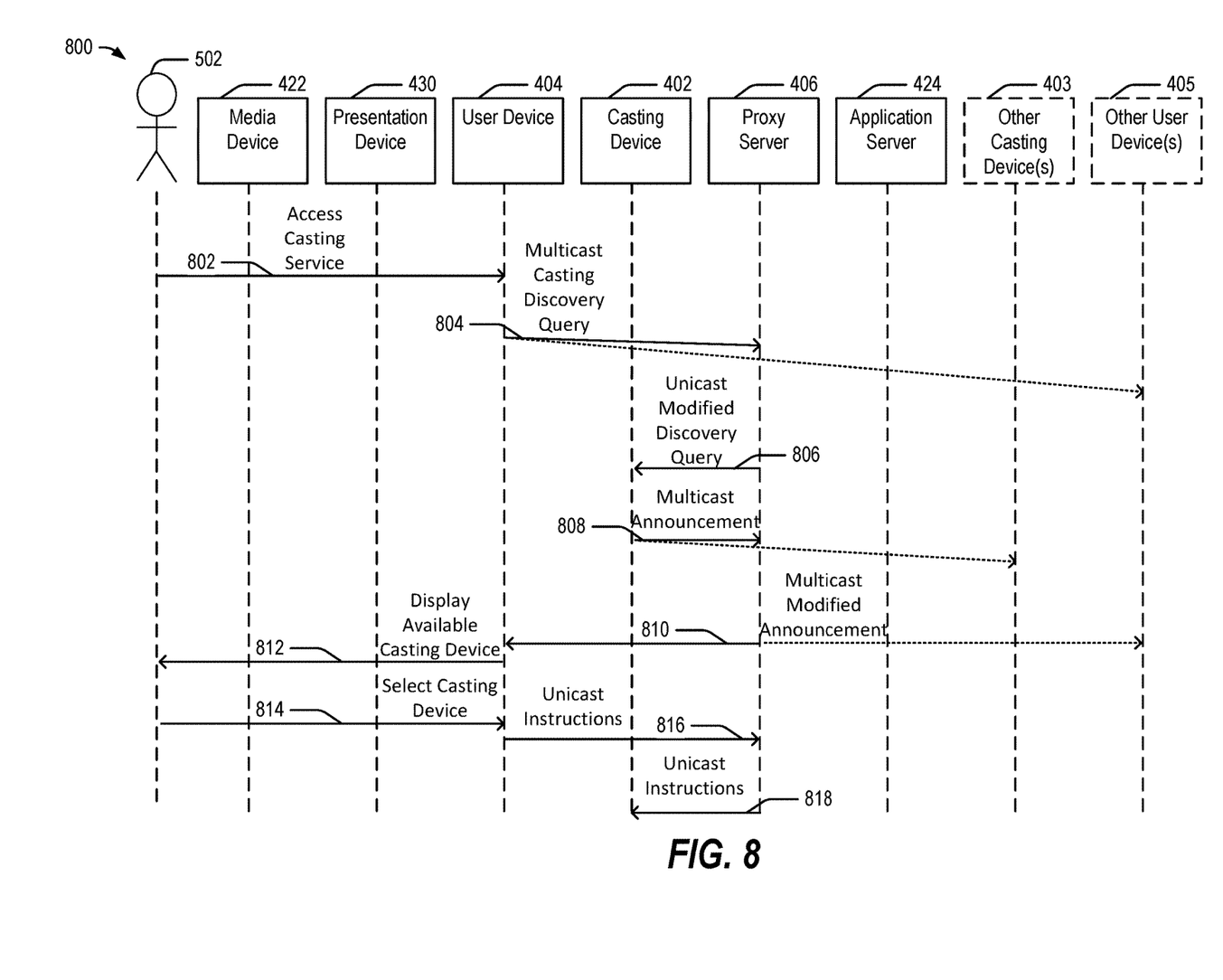
FIG. 8 is a diagram illustrating operations that may be performed by the system to forward communications between user devices and casting devices.

Referring to FIG. 8, a diagram 800 illustrating operations that may be performed by the system 400 to forward communications between user devices and casting devices is shown. As illustrated, the user 502 may access a casting service at the casting device 402. For example, the user 502 may launch a streaming service that supports casting and then select an option to "cast" (e.g., transfer) the stream to a casting device. In response to receiving input requesting casting from the user 502, the user device 404 multicasts a casting discover query, at 804, on the second network 410. The one or more other user devices 405 (if any are connected to the second network 410) and the proxy server 406 receive the discovery query. In some implementations, the discovery query corresponds to a multicast DNS discovery packet. The proxy server 406 receives the discovery query and unicasts the discovery query to one or more casting devices based on an identifier (e.g., an IP address) of the user device 404 included in the discovery query and the translation data structure stored at the proxy server 406 (or remotely), at 806. In the illustrated example, the proxy server 406 unicasts the discovery query to the casting device 402 based on the translation data structure. For example, the translation data structure may include an entry "100, 10.10.10.114, 192, 168.99.108, 8009, cast" indicating that user device IP address 10.10.10.114 is associated with casting device IP address 192.168.99.108. Accordingly, in response to the discovery query being received from IP address 10.10.10.114, the proxy server 406 may unicast the discovery query to IP address 192,168.99.108.

In response to receiving the unicast discovery query, the casting device 402 multicasts an announcement to the first network 408, at 808. The multicast announcement is received by the proxy server 406 and any other devices (e.g., the one or more other casting devices 403) connected to the first network 408. The multicast announcement indicates an IP address of the casting device 402 and a friendly name of the casting device 402. The multicast announcement may correspond to an mDNS discovery response packet. In some implementations, the multicast announcement corresponds to the first multicast announcement 112 of FIG. 1.

In response to the multicast announcement, the proxy server 406 multicasts a modified version of the announcement to the second network 410, at 810. The proxy server 406 generates the modified version of the announcement by replacing the IP address of the casting device 402 with an IP address of the proxy server 406 and by changing the friendly name of the casting device 402 based on the translation data structure stored at the proxy server 406 (or remotely). In some implementations the last 4 bytes of the multicast announcement include the IP address of the casting device 402 and the proxy server 406 overwrites these last 4 bytes with the IP address of the proxy server 406 as part of generating the modified version of the announcement. For example, the proxy server 406 may overwrite 192.168.99.108 (e.g., the IP address of the casting device 402) with 10.10.10.45 (the IP address of the proxy server 406).

Changing the friendly name may include identifying the friendly name in the multicast announcement based on a field marker (e.g., "fn="). Rather than overwriting the bytes of the friendly name in the multicast announcement to generate the modified version of the announcement, the proxy server 406 may instead copy a first portion of the announcement preceding the friendly name, the new friendly name, and a portion of the announcement following the friendly name to the modified version of the announcement. Because the new friendly name may be of a different length than the original friendly name, the proxy server 406 may alter further elements of the multicast announcement to generate the modified version of the announcement. Other fields that may be altered by the proxy server 406 include a friendly name length field, a text (TXT) record length field, a compression offset pointer field, or a combination thereof. For example, the proxy server 406 may overwrite the friendly name length field based on a length of the new friendly name. The proxy server 406 may locate the friendly name length field based on the field marker of the friendly name. To illustrate, the friendly name length field may correspond to a byte immediately preceding the field marker of the friendly name. The TXT record may include the friendly name, accordingly, the proxy server 406 may overwrite the TXT record length field to reflect a change in the length of the TXT record caused by the change in length of the friendly name field. The proxy server 406 may locate the TXT record length field by locating an "id" field marker. The TXT record length field may begin 3 bytes before the "id" field marker. The proxy server 406 may overwrite the compression offset field based on a change in length of the friendly name (e.g., a difference between the new friendly name and the friendly name in the announcement). The compression offset field points to a first instance of a host name in the announcement. The compression offset field may begin 16 bytes before the end of the announcement.

In some implementations, the proxy server 406 further includes the port identified in the entry of the translation data structure corresponding to the casting device 402.

Because the proxy server 406 transmits the modified announcement as a multicast message, the user device 404 may receive the modified announcement even in implementations in which the user device 404 is not configured to receive announcements via unicast. In response to receiving the modified announcement, the user device 404 displays an indication that a casting device is available, at 812. The indication includes the friendly name listed in the modified announcement. In some implementations, the proxy server 406 is configured to modify packets from more than one casting device to recite the same friendly name. Accordingly, a display of the user device 404 may be less cluttered by indications associated with unreachable casting devices. For example, the proxy server 406 may include entries "100, 10.10.10.114, 192.168.99.108, 8009, cast" and "200, 10.10.10.123, 192.168.99.111, 8009, cast." Accordingly, the proxy server 406 may replace the friendly names of announcements received from both 192.168.99.108 and 192.168.99.111 with "cast." In such implementations, the user device 404 may receive modified announcements from the proxy server 406 that appear to be from the same casting device despite being sent by the proxy server 406 responsive to announcements from two different casting devices.

The user 502 selects a casting device displayed at the user device 404, at 814. In response to receiving the selection, the user device 404 unicasts media instructions to the proxy server 406 based on the IP address, port, or a combination thereof identified in the modified announcement, at 816. The media instructions may include a link to a media stream, a command associated with the media stream (e.g., play, pause, rewind, fast forward, etc.), or a combination thereof. The proxy server 406 unicasts the instructions to the casting device 402 based on the translation data structure stored at the proxy server 406 (or remotely), at 818.

The casting device 402 receives the media instructions and responds accordingly. For example, the casting device 402 may access the link included in the unicast instructions to begin streaming the media content indicated by the user device 404. The casting device 402 may further output the media content to the media device 422 for presentation at the presentation device 430. Thus, FIG. 8 illustrates operations that may be performed by the system 400 to forward communications between user devices and casting devices.

Figure 9:
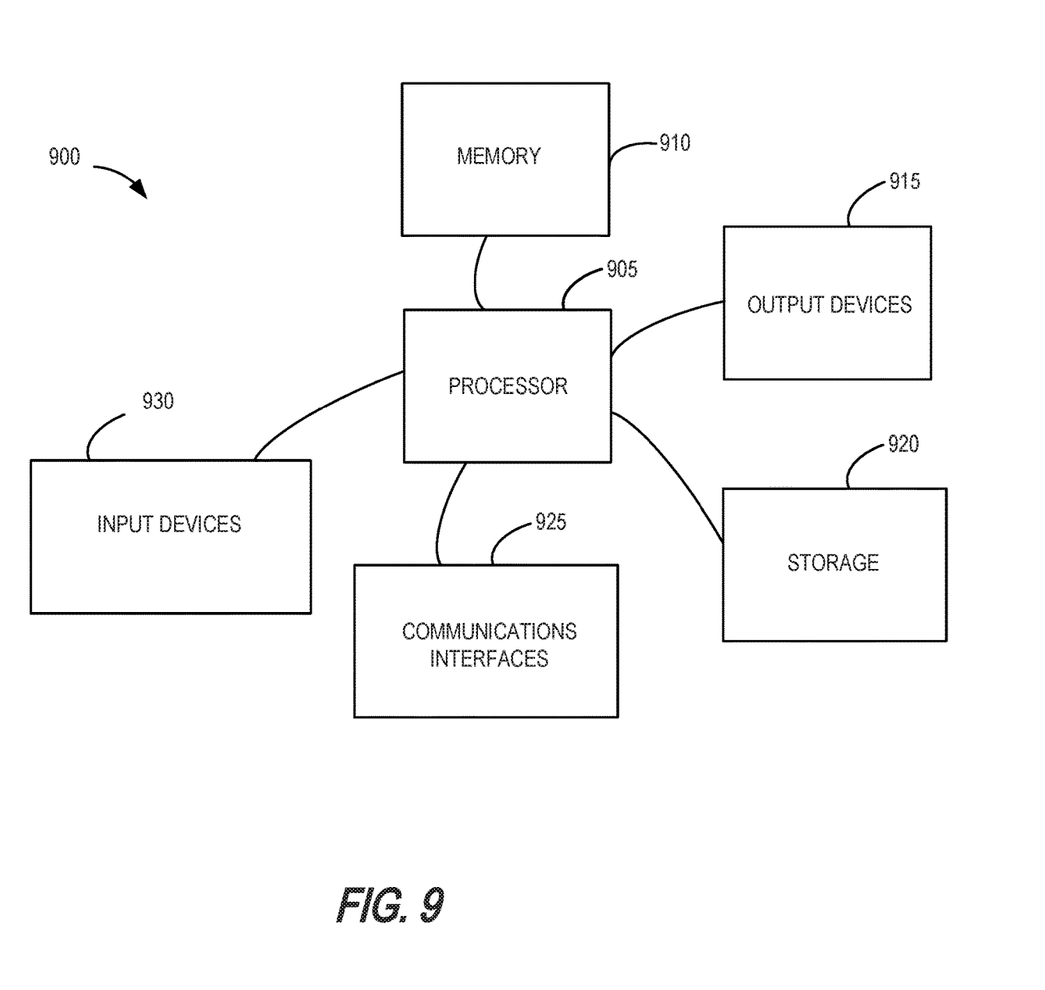
FIG. 9 is a block diagram of a computing device that may implement the disclosed techniques.

FIG. 9 illustrates a high-level block diagram of a computing device (computing system) 900 that may be used to implement one or more computing devices disclosed herein (e.g., the casting device 102, the user device 104, the proxy server 106, the second user device 204, the second casting device 302, the presentation device 430, the media device 422, the casting device 402, the one or more other casting devices 403, the one or more other media devices 434, the one or more other presentation devices 432, the user device 404, the one or more other user devices 405, the application server 424, the proxy server 406, etc.). The computing device 900 illustrated in FIG. 9 could represent a client device or a physical server device and include either hardware or virtual processor(s) depending on the level of abstraction of the computing device. In some examples (without abstraction) the computing device 900 and its elements as shown in FIG. 9 each relate to physical hardware and in some examples one, more, or all of the elements could be implemented using emulators or virtual machines as levels of abstraction. In any case, no matter how many levels of abstraction away from the physical hardware, the computing device 900 at its lowest level may be implemented on physical hardware.

In the illustrated example, the computing device 900 includes one or more input devices 930, such as a keyboard, mouse, touchpad, or sensor readout (e.g., biometric scanner) and one or more output devices 915, such as displays, speakers for audio, or printers. While illustrated in FIG. 9, some devices described herein may not include the input devices 930 and/or the output devices 915. For example, the casting device 102 may not include the input devices 930 or the output devices 915.

The computing device 900 also includes communications interfaces 925, such as a network communication unit that could include a wired communication component and/or a wireless communications component, which are communicatively coupled to a processor 905. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods. In some examples, the communications interfaces 925 are connected to different networks. For example, the proxy server 106 may include one or more interfaces connected to the first network 108 and one or more interfaces connected to the second network 110. Similarly, the proxy server 406 may include one or more interfaces connected to the first network 408 and one or more interfaces connected to the second network 410.

As illustrated in FIG. 9, the computing device 900 includes the processor 905. The processor 905 includes one or more hardware processors, where each hardware processor may have a single or multiple processor cores. In one embodiment, the processor 905 includes at least one shared cache that stores data (e.g., computing instructions) that are utilized by one or more other components of the processor 905. For example, the shared cache may be a locally cached data stored in a memory for faster access by components of the processing elements that make up processor 905. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 9, the processing elements that make up processor 905 may also include one or more other types of hardware processing components, such as graphics processing units (GPUs), application specific integrated circuits (ASICs), field-programmable gate arrays (FPGAs), and/or digital signal processors (DSPs).

FIG. 9 illustrates that a memory 910 may be operatively and communicatively coupled to the processor 905. The memory 910 may be a non-transitory medium configured to store various types of data. For example, the memory 910 may include one or more volatile devices such as random access memory (RAM). The computing device 90 further includes storage devices 920 that can include one or more disk drives, optical drives, solid-state drives (SSDs), tap drives, flash memory, read only memory (ROM), and/or any other type memory designed to maintain data for a duration time after a power loss or shut down operation. In certain embodiments, the storage devices 920 may be used to store overflow data if allocated RAM is not large enough to hold all working data. The storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by the processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for the processor 905 to accomplish specific, non-generic, particular computing functions.

After the compiling process, the encoded instructions may then be loaded as computer executable instructions or process steps to the processor 905 from the storage devices 920, from the memory 910, and/or embedded within the processor 905 (e.g., via a cache or on-board ROM). The processor 905 may be configured to execute the stored instructions or process steps in order to perform operations as described herein. Stored data, e.g., data stored by the storage device 920, may be accessed by the processor 905 during the execution of computer executable instructions or process steps to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 900 may comprise other components well known in the art, such as sensors, powers sources, and/or analog-to-digital converters, not explicitly shown in FIG. 9.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A method comprising:
   receiving, at a proxy server, a multicast announcement through a first network, the multicast announcement received from a casting device;
   generating, at the proxy server, a modified version of the multicast announcement by:
      replacing a friendly name identified in the multicast announcement with a new friendly name identified by a translation data structure; and
      modifying a compression offset pointer based on a difference between a length of the new friendly name and a length of the friendly name identified in the multicast announcement; and
   multicasting, from the proxy server, the modified version of the multicast announcement to a second network.

2. The method of claim 1, wherein generating the modified version of the multicast announcement further includes modifying a friendly name length field of the multicast announcement based on a length of the new friendly name.

3. The method of claim 1, further comprising:
   receiving, at the proxy server, a second multicast announcement through the first network, the second multicast announcement received from a second casting device;
   generating, at the proxy server, a modified version of the second multicast announcement by replacing a second friendly name identified in the second multicast announcement with the new friendly name; and
   multicasting, from the proxy server, the modified version of the second multicast announcement to the second network.

4. The method of claim 1, further comprising:
   receiving, at the proxy server, a unicast of media instructions through the second network; and
   unicasting the media instructions to the casting device from the proxy server based on the translation data structure.

5. The method of claim 4, wherein the media instructions include a link to a media stream.

6. The method of claim 1, wherein the multicast announcement includes a multicast domain name system (mDNS) discovery response.

7. The method of claim 6, further comprising:
   receiving an mDNS discovery query through the second network; and
   unicasting, prior to receiving the mDNS discovery response, a discovery query to the casting device based on the translation data structure and an internet protocol (IP) address of the mDNS discovery query.

8. A computing device comprising:
   one or more processors; and
   a memory device storing instructions executable by the one or more processors to:
      receive, at a proxy server, a multicast announcement through a first network, the multicast announcement received from a casting device;
      generate, at the proxy server, a modified version of the multicast announcement by:
         replacing a friendly name identified in the multicast announcement with a new friendly name identified by a translation data structure; and
         modifying a compression offset pointer based on a difference between a length of the new friendly name and a length of the friendly name identified in the multicast announcement; and
      multicast, from the proxy server, the modified version of the multicast announcement to a second network.

9. The computing device of claim 8, wherein generating the modified version of the multicast announcement further includes modifying a friendly name length field of the multicast announcement based on a length of the new friendly name.

10. The computing device of claim 8, wherein the instructions are further executable by the one or more processors to:
    receive, at the proxy server, a second multicast announcement through the first network, the second multicast announcement received from a second casting device;
    generate, at the proxy server, a modified version of the second multicast announcement by replacing a second friendly name identified in the second multicast announcement with the new friendly name; and
    multicast, from the proxy server, the modified version of the second multicast announcement to the second network.

11. The computing device of claim 8, wherein the instructions are further executable by the one or more processors to:
    receive, at the proxy server, a unicast of media instructions through the second network; and
    unicast the media instructions to the casting device from the proxy server based on the translation data structure.

12. The computing device of claim 11, wherein the media instructions include a link to a media stream.

13. The computing device of claim 8, wherein the multicast announcement includes a multicast domain name system (mDNS) discovery response.

14. The computing device of claim 13, wherein the instructions are further executable by the one or more processors to:
    receive an mDNS discovery query through the second network; and
    unicast, prior to receiving the mDNS discovery response, a discovery query to the casting device based on the translation data structure and an internet protocol (IP) address of the mDNS discovery query.

15. A proxy server comprising:
one or more processors; and
a memory device storing instructions executable by the one or more processors to:
   receive a multicast announcement through a first network, the multicast announcement received from a casting device;
   generate a modified version of the multicast announcement by:
      replacing a friendly name identified in the multicast announcement with a new friendly name identified by a translation data structure; and
      modifying a compression offset pointer based on a difference between a length of the new friendly name and a length of the friendly name identified in the multicast announcement; and
   multicast the modified version of the multicast announcement to a second network.

16. The proxy server of claim 15, wherein generating the modified version of the multicast announcement further includes modifying a friendly name length field of the multicast announcement based on a length of the new friendly name.

17. The proxy server of claim 15, wherein the instructions are further executable by the one or more processors to:
   receive a second multicast announcement through the first network, the second multicast announcement received from a second casting device;
   generate a modified version of the second multicast announcement by replacing a second friendly name identified in the second multicast announcement with the new friendly name; and
   multicast the modified version of the second multicast announcement to the second network.

18. The proxy server of claim 15, wherein the instructions are further executable by the one or more processors to:
   receive, at the proxy server, a unicast of media instructions through the second network; and
   unicast the media instructions to the casting device from the proxy server based on the translation data structure.

19. The proxy server of claim 15, wherein the media instructions include a link to a media stream.

20. The proxy server of claim 15, wherein the multicast announcement includes a multicast domain name system (mDNS) discovery response.

* * * * *